L. FAWCETT.
Rein-Holders.
No. 145,559.  Patented Dec. 16, 1873.
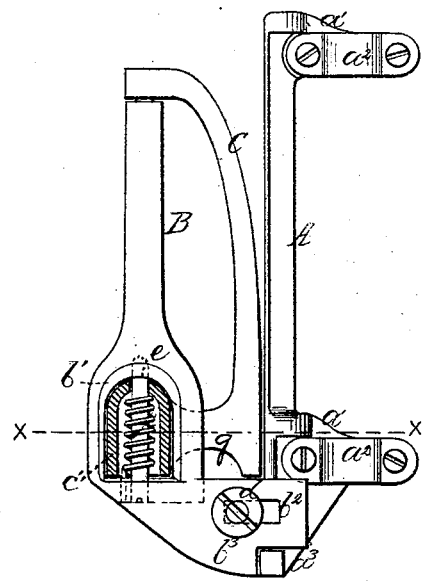
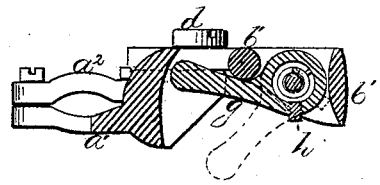
Witnesses:
W. K. DuHamel
Thomas Byrne
Inventor:
Lemuel Fawcett
Per H. J. Abbot
Attorney

UNITED STATES PATENT OFFICE.

LEMUEL FAWCETT, OF SALEM, OHIO.

IMPROVEMENT IN REIN-HOLDERS.

Specification forming part of Letters Patent No. 145,559, dated December 16, 1873; application filed November 19, 1873.

*To all whom it may concern:*

Be it known that I, LEMUEL FAWCETT, of Salem, county of Columbiana and State of Ohio, have invented certain new and useful Improvements in Rein-Holders, of which the following is a specification:

My invention relates to an improved device to be attached to the dash-board of a buggy or other vehicle; and it consists in a pivoted wing arranged to operate, in combination with a concave surface, on the portion attached to the dash-board; also, in a projection on the wing for the purpose of limiting its backward motion; also, in a slot and set-screw in the portion to which the wing is pivoted, for the purpose of regulating the distance between the wing and the concave portion.

In the accompanying drawing, Figure 1 is a side elevation of my invention, partly in section. Fig. 2 is a transverse section taken in the line $x$ $x$ of Fig. 1.

A represents a standard, formed with lugs $a^1$ $a^1$ and bars $a^2$ $a^2$, for the purpose of clamping it to the edge of the dash-board by means of screws passing through said lugs and bars in the usual manner. An arm, $a^3$, extends from the lower portion of the standard A in a direction opposite to that of the lower lug $a^1$. B represents a standard, formed with an arm, $b^3$, extending from its lower end, and having a slot, $b^2$, for the reception of a screw, $d$, by which the standards are secured together. C represents a wing, the outline of which resembles a quarter of an acute oval or ellipse. This wing C is pivoted to the standard B by a pin through its upper end passing into the upper end of said standard; and on its lower end is an enlargement in the shape of a truncated cone, $c'$, which works in a recess, $b^1$, of corresponding form in the lower part of the standard B, and is held in place by a spindle, $e$, surrounding which is a spiral spring, $f$, having one end secured to the bottom of the recess $b^1$, and the other end secured to the inside of the cone $c'$, which spring has a tendency to keep the wing in the position shown in full lines in Fig. 2. On the side of the standard A, toward the wing, is a concave surface, the plane of which describes a larger circle than that described by the wing in its oscillation, so that when the wing is in the position shown in full lines, its outer edge is nearly in contact with the concave surface; but when moved back to the position shown in dotted lines, there is sufficient space between the two parts to readily admit the reins; and when the reins are so placed, the wing C operates so as to engage them, in combination with the concave surface, and clamps the reins securely, so that they cannot be removed without pressing back the wing. The backward motion of the wing is limited by means of a stud or projection, $h$, on the truncated cone $c'$, which strikes against the side of the recess $b^1$, and arrests the wing when it is pressed back to the required point. The forward motion is limited by the horizontal lower portion $g$ coming in contact with the front portion of the recess $b^1$.

By means of the slot $b^2$ and the screw $d$ passing through it and into the arm $a^3$, the distance between the wing and the concave surface may be adjusted to suit different thicknesses of reins.

What I claim as new, and desire to secure by Letters Patent, is—

1. The pivoted wing C, in combination with standard A, having concave surface, as shown and described, for the purpose specified.

2. The stud $h$, on the cone $c'$, for limiting the backward motion of the wing, substantially as shown and described.

3. The combination of the slot $b^2$, set-screw $d$, and arms $a^3$ $b^3$, for regulating the distance between the wing and the concave surface, substantially as shown and described.

In testimony that I claim the foregoing as my invention I hereunto affix my signature.

LEMUEL FAWCETT.

Witnesses:
CHARLES TRASCHER,
R. H. GARRIGUES.